Figure 1:
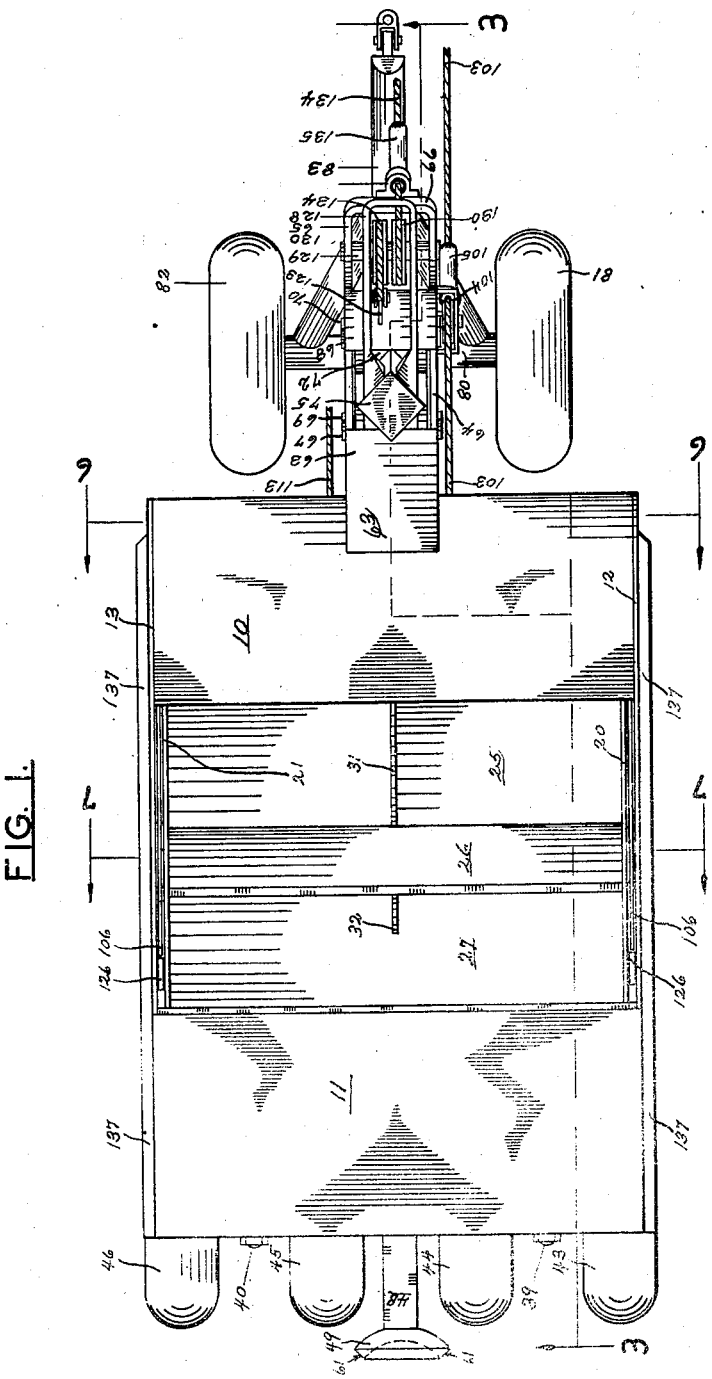

Dec. 5, 1939.                C. LE BLEU                2,182,670
                          HEAVY DUTY SCRAPER
              Filed Jan. 24, 1936            10 Sheets-Sheet 1

INVENTOR
BY  Charles Le Bleu
ATTORNEY

Dec. 5, 1939.  C. LE BLEU  2,182,670

HEAVY DUTY SCRAPER

Filed Jan. 24, 1936  10 Sheets-Sheet 3

INVENTOR
BY Charles Le Bleu
ATTORNEY

INVENTOR
BY Charles Le Bleu
ATTORNEY

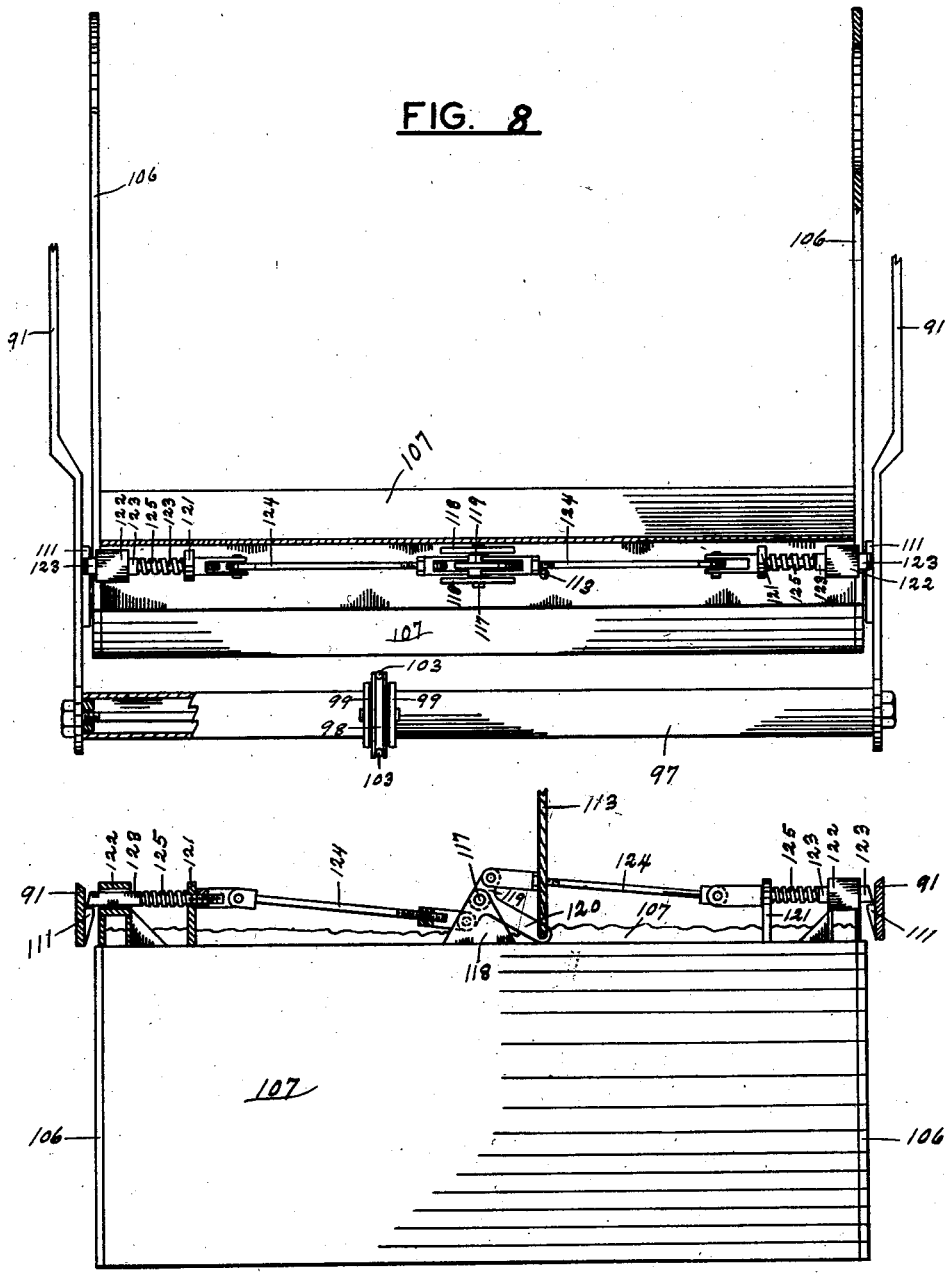

Dec. 5, 1939.   C. LE BLEU   2,182,670
HEAVY DUTY SCRAPER
Filed Jan. 24, 1936   10 Sheets-Sheet 6

FIG. 10

INVENTOR
BY Charles Le Bleu
ATTORNEY

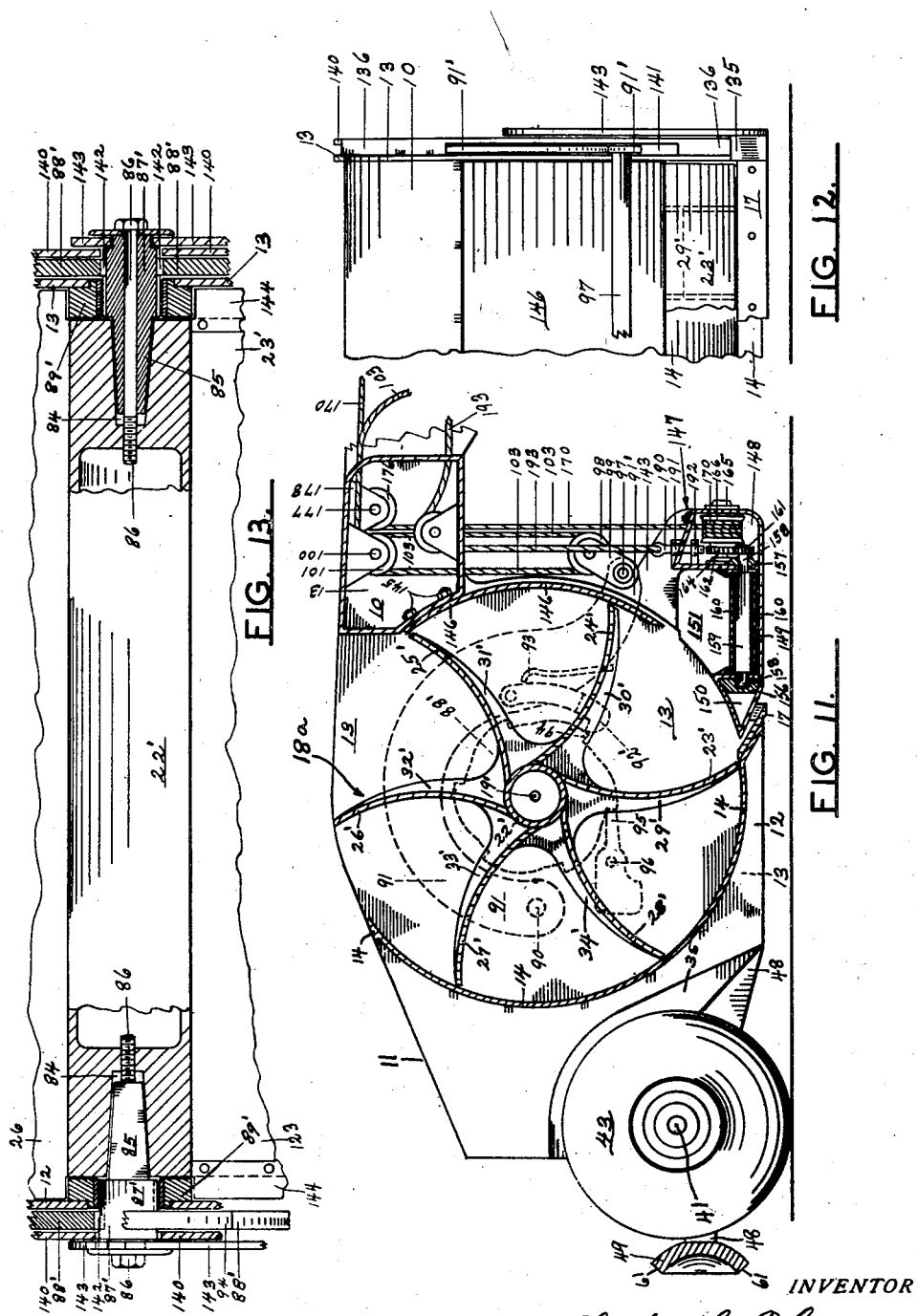

Dec. 5, 1939.  C. LE BLEU  2,182,670
HEAVY DUTY SCRAPER
Filed Jan. 24, 1936  10 Sheets-Sheet 8

INVENTOR
BY Charles Le Bleu
ATTORNEY

INVENTOR
BY Charles Le Bleu
ATTORNEY

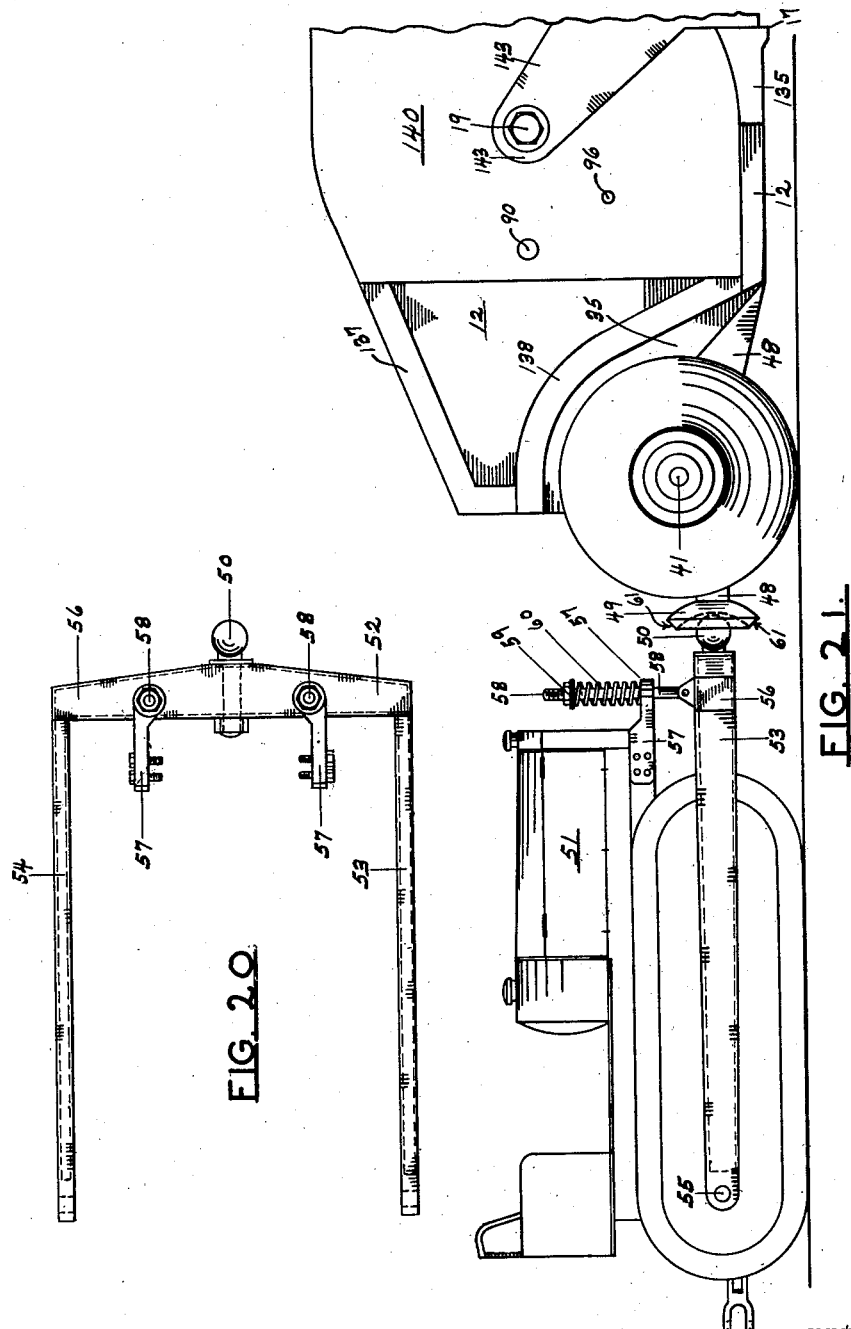

Patented Dec. 5, 1939

2,182,670

UNITED STATES PATENT OFFICE 2,182,670

HEAVY DUTY SCRAPER

Charles Le Bleu, Los Angeles, Calif.

Application January 24, 1936, Serial No. 60,674

16 Claims. (Cl. 37—126)

This invention relates generally to earth digging, scraping, leveling and transporting devices, as used in leveling ground, building roads, excavating, grading and transporting materials from one place to another, and more specifically the invention relates to that class known as scrapers and is an improvement upon the disclosures made in my pending application Serial No. 756,492, filed December 7, 1934, now Patent No. 2,152,700.

Referring to the drawings of my pending application No. 756,492, it will be noted that stops 164, see Fig. 12, prevent complete closing of the auxiliary shutter 160, and that no. means are shown for positively determining the size of the intake opening. Furthermore it will be noted that the frame structure is open on its lower side. Thus, while it is possible to have all the compartments of the carrier 21 full at the same time when the load is accumulated and loaded into the carrier 21 over the scraper blade 158, still, it would not be possible to have all compartments full at the same time if the scraper were used as a wagon for transporting materials loaded into the carrier 21 at the top by auxiliary equipment such as a power shovel.

Therefore, an object of this invention is the provision, in a material moving device having a carrier comprising a plurality of material carrying units adapted to be moved successively into loading position, of means whereby all of said units may be full at the same time regardless of the means used to load the materials into the units, to the end that said device may serve as a transporting device to be loaded by any suitable auxiliary means such as a power shovel.

Another object is the provision in a scraper of the class described adapted to receive and carry materials scraped up by the advancing movement of the scraper, of such correlation and construction of parts, members and features that the scraper may also serve as a transporting device to be loaded by any suitable auxiliary loading device.

Another object of this invention is the provision in a device of the class described including a carrier comprising a multiplicity of material carrying units, of movable shutter means constructed, adapted and mounted to serve as a shutter for a plurality of said units at the same time and means to move said shutter relative to said carrier.

Another object is the provision in a device of the class described including a carrier comprising a multiplicity of material carrying units arranged about a horizontal axis and supported from the ground for rotary movement, of shutter means for said units adapted and mounted to move upwardly therewith a limited distance whereby upwardly moving materials will not contact stationary structure, thus eliminating friction.

Another object is the provision in a device of the class described including a carrier supported from the ground for rotary movement and movable shutter means therefor, of a common operating means to revolve said carrier and adjust said shutter relative thereto.

Another object is the provision in a device of the class described including a carrier and shutter means therefor movable therewith and relative thereto, of a common operating means for said carrier and said shutter releasably connected to said shutter.

Another object is the provision in a device of the class described including a carrier comprising a plurality of material carrying units and shutter means for said carrier, of means to manipulate said carrier and said shutter simultaneously or independently.

Another object is the provision in a device of the class described including a carrier comprising a plurality of material carrying units and shutter means for said carrier, of power operated means to adjust said shutter relative to said carrier.

Another object of this invention is the provision in a device of the class described including a carrier comprising a plurality of material carrying units arranged about a horizontal axis and supported from the ground for rotary movement, of cable operated means to revolve said carrier.

Another object is the provision in a device of the class described including a plurality of material carrying units arranged about a horizontal axis and adapted to be moved successively into loading position, of control means having limited movement in a plane and operable to apply step by step movement to said carrier.

Another object is the provision in a device of the class described including a carrier comprising a plurality of material carrying units arranged about a horizontal axis and supported from the ground for rotary movement, of control means operable to apply step by step movement to said carrier and independent means to prevent reverse rotation of said carrier.

Another object is the provision in a device of the class described including a carrier comprising a multiplicity of material carrying receptacles arranged about an axis and supported from the ground for rotary movement whereby said receptacles may be moved successively into loading position, of control means therefor having limited back and forth movement to apply step by step rotation to said carrier to bring each receptacle in turn into loading position.

The scraper herein described is particularly adapted to the moving of very large quantities of materials, say 25 yards or more. Under certain conditions it may be desirable to use, in addition to the draft device connected to the forward end of the scraper, a second draft device, such as a tractor, in pushing position behind the scraper to assist in moving the scraper forward during the loading operation after which the draft device connected to the front of the scraper may then draw the scraper with its accumulated load of material to any desired location for dumping. Thus a lighter and faster draft device may be used at the forward end of the scraper, such as a truck, and a heavy duty device, such as a tractor, at the rear end of the scraper during the loading operation.

Therefore, still another object of this invention is the provision, in a device of the class described, of means mounted on the rear end of the scraper whereby a tractor or similar device may be used to push the scraper forward.

Referring now again to my pending application for Letters Patent herein before referred to, it will be seen that the elevation of the carrier with respect to the ground is determined by raising or lowering the rear end of the supporting frame. However, when means are provided at the rear of the scraper for pushing the same forward, it becomes desirable to control the elevation of the carrier with respect to the ground by raising and lowering the forward end of the supporting frame.

Therefore, another object of this invention is the provision in a scraper, including a carrier comprising a plurality of material carrying units arranged about a horizontal axis and supported from the ground by a main frame, of means whereby the elevation of said carrier with respect to the ground may be determined by raising and lowering the forward end of the main supporting frame, and a further object is the provision of novel means for supporting the forward end of the main frame for up and down movement with respect to the ground.

Another object is the provision of novel means for attaching a pony truck to the forward end of the device.

Another object is the provision in a device of the class described, including a carrier adapted to be supported from the ground for rotary movement, of a supporting frame therefor including spaced apart plates and a control mechanism for revolving said carrier operably mounted between said plates.

Still another object of this invention is the provision in a material moving device, including a carrier adapted to receive materials scraped up by the advancing movement of the device and a shutter for said carrier of means carried on said shutter and operable to discharge materials to the side of the device.

Another object is the provision, in a device of the class described having a main frame including substantially spaced apart side frames and a scraper blade extending transversely of the main frame between the side frames, each of said side frames comprising spaced apart plates, of a digging and scraping member attached to each of said side frames and constituting in effect an extension of the main scraper blade to or beyond the outside limits of the side frames whereby the device may be operated against a substantially vertical bank to remove materials from the corner at the junction of the vertical bank with a horizontal surface.

Still another object is simplification of control mechanism for a device of the class described by the provision of parts members and features requiring a minimum of precision work in the process of manufacture.

Still other objects and advantages will appear as the following description is read in connection with the accompanying drawings and the invention is finally pointed out in the claims.

Figure 2:
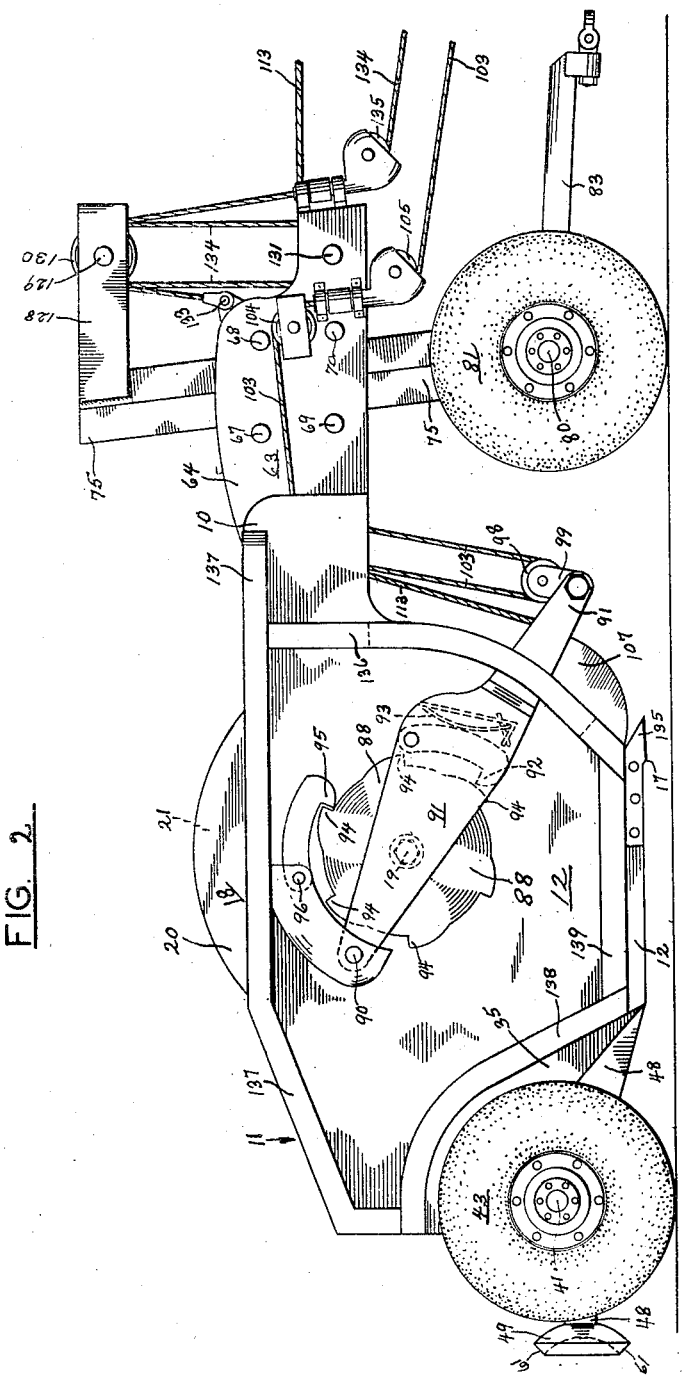
Figures 3, 4, 5:
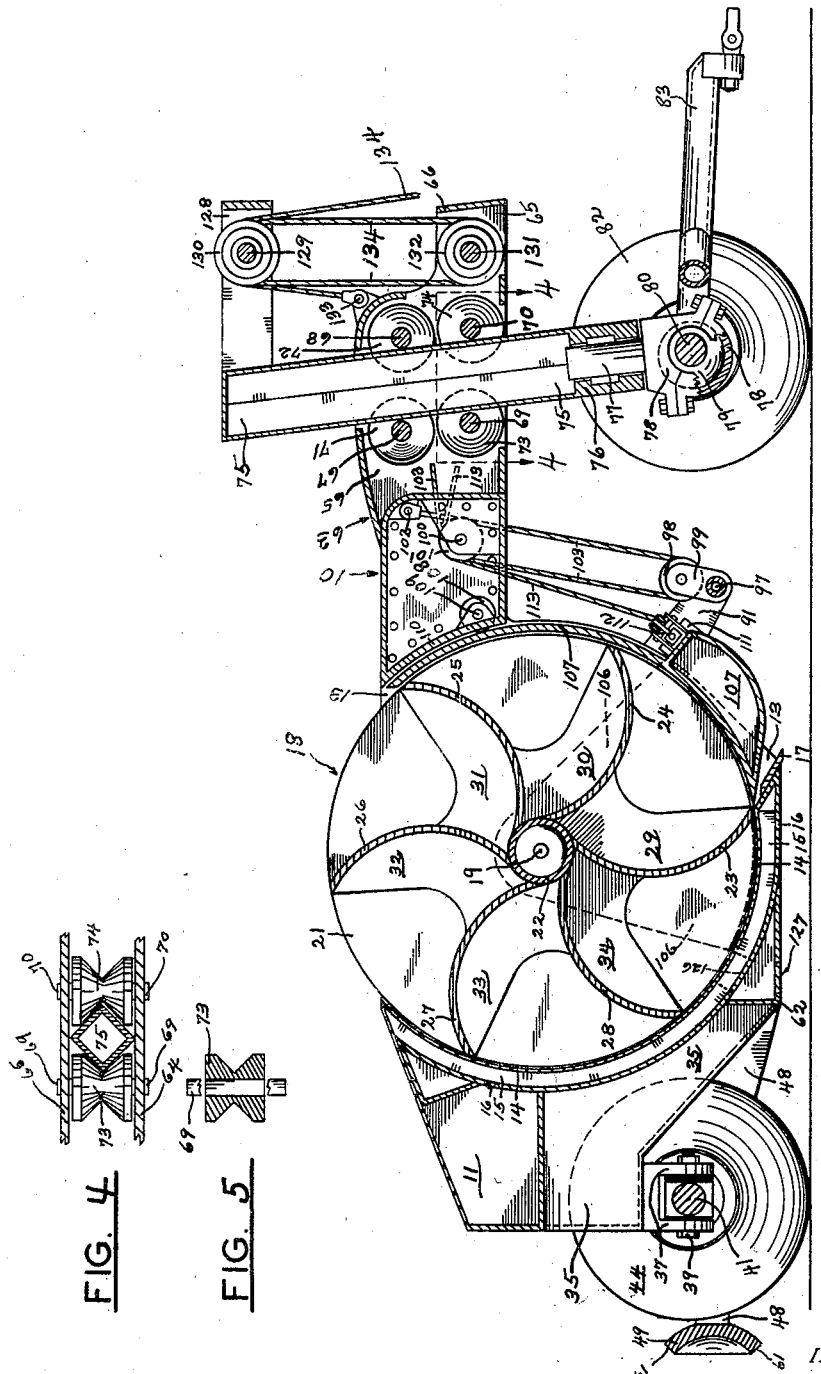
Figure 6:
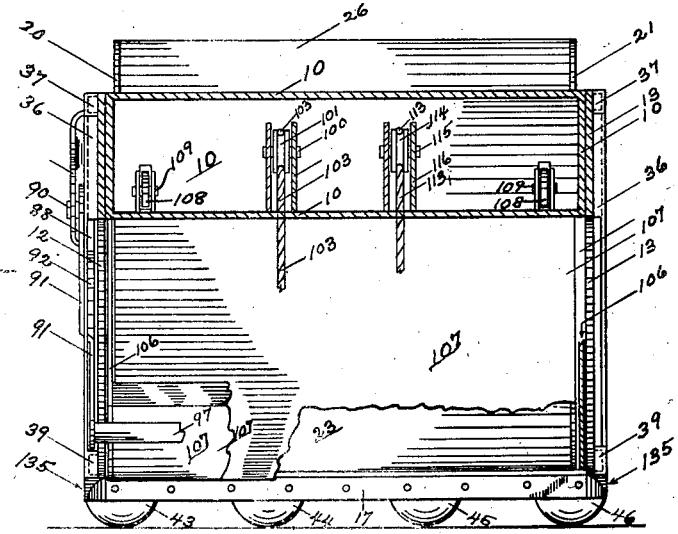
Figure 7:
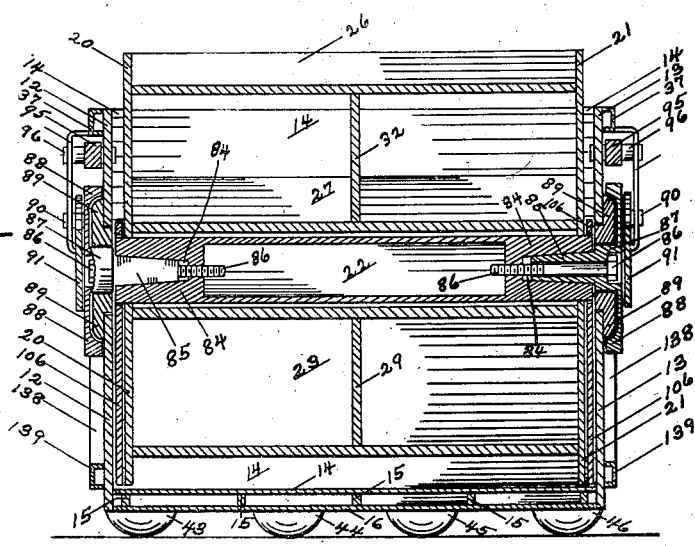
Figure 14:
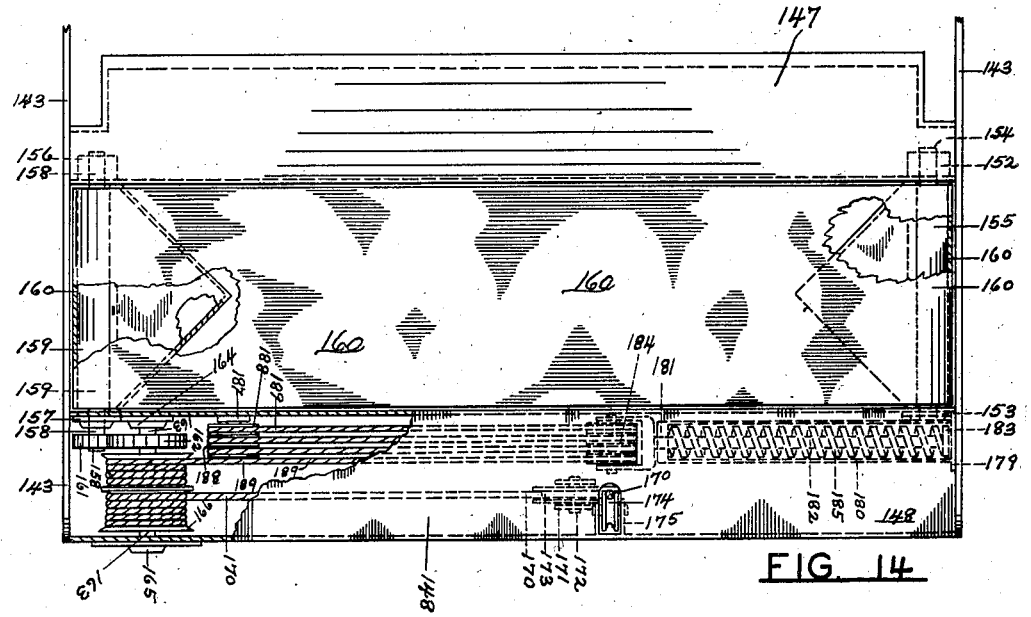
Figure 15:
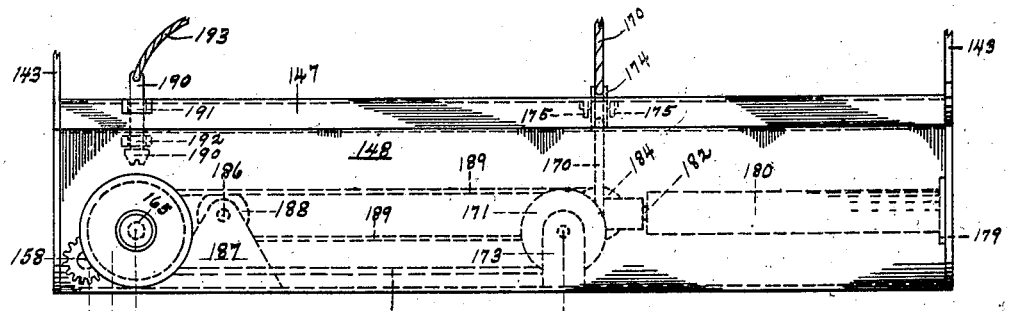
Figures 16, 17:
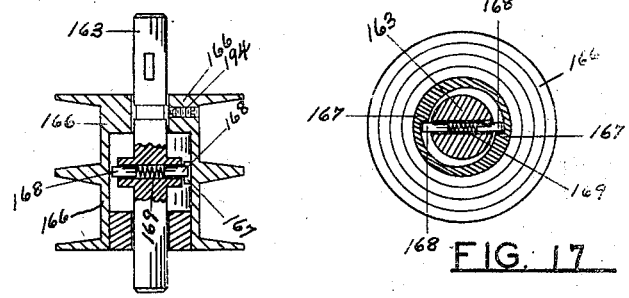
Figure 18:
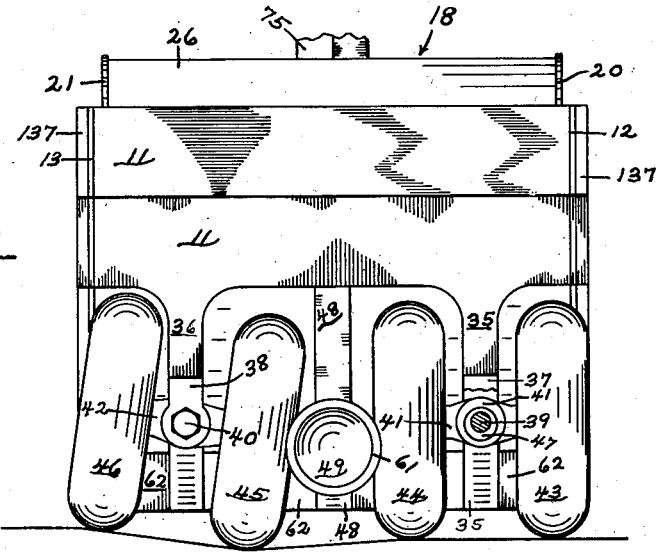
Figure 19:
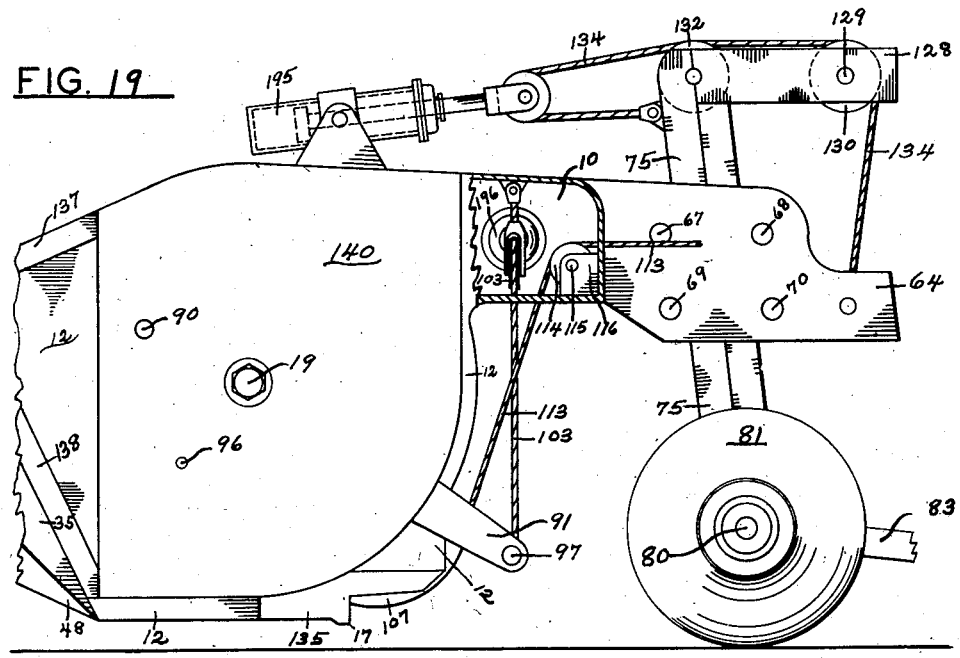

In the drawings:

Figure 1 is a plan view of the device.
Figure 2 is a side elevation of the device.
Figure 3 is a side elevation in section taken on a line 3—3 of Figure 1.
Figure 4 is a section taken through line 4—4 of Figure 3.
Figure 5 is a section of one of the rollers shown in Figure 4.
Figure 6 is a section taken on line 6—6 of Figure 1.
Figure 7 is a section taken on a line 7—7 of Figure 1.
Figure 8 is an enlarged plan view, partly in section of the shutter better shown in Figure 3.
Figure 9 is an enlarged fragmentary frontal view partly in section of Figure 8.
Figure 10 is a side elevation of a modified form of the device.
Figure 11 is a fragmentary side elevation partly in section of Figure 10.
Figure 12 is a fragmentary frontal view of Figures 10 and 11 illustrating side frames comprising spaced apart plates having control mechanism mounted therebetween, the shutter body being eliminated.
Figure 13 is a fragmentary view in section illustrating the mounting of the carrier on the frame in Figures 10 and 11.
Figure 14 is an enlarged fragmentary plan view partly in section of the shutter shown in Figures 10 and 11.
Figure 15 is a frontal elevation of Figure 14.
Figure 16 is the winding drum of Figures 10, 11, 14, and 15 in section.
Figure 17 is a cross section of the winding drum of Figure 16.
Figure 18 is a view of the rear end of the device illustrating the transversely tiltable rear trucks, and the location of bumper means adapted to receive the pushing efforts of a tractor behind the device.
Figure 19 illustrates the control of the device by hydraulic means.
Figure 20 is a plan view of a pusher frame adapted to be connected to a tractor and adapted at its forward end to engage a companion member carried by the device herein described whereby the tractor may push the device forward.
Figure 21 is a fragmentary side elevation of the device herein described with the tractor, having mounted thereon the pusher frame of Figure 20, in pushing position.

Referring now to Figures 1 to 9 inclusive and Figure 18, the device comprises front and rear box like members 10 and 11 to the ends of which are secured side frames 12 and 13. These side frames 12 and 13 may be secured to members 10 and 11 in any suitable manner taking into consideration requirements for assembling the various elements of the device. Extending transversely of the device between the side frames 12 and 13 and attached thereto is a curved back and bottom plate 14. Secured to plate 14 at its rear side is a plurality of spaced apart ribs 15. Extending transversely of the device rearwardly of ribs 15 and secured thereto is a curved plate 16 secured at its ends to side frames 12 and 13. Plate 16 constitutes the forward wall of the box like member 11, detachably secured to the forward edge of plate 14 at the junction of plates 14 and 16 and between the side frames 12 and 13 is a scraper blade 17. Thus there is formed in the main frame structure a substantially cylindrical compartment open at its lower forward side for receiving and discharging materials and open at its top side for receiving materials which may be loaded therein by any suitable auxiliary loading means. Positioned within the cylindrical compartment and journaled on side frames 12 and 13 at 19 is a partitioned carrier 18 comprising a multiplicity of compartments arranged about a horizontal axis and including head plates 20 and 21 spaced apart and secured at their centers each to an end of a beam 22, and partitions 23, 24, 25, 26, 27, and 28, secured at their inner edges to beam 22 and at their ends to head plates 21 and 22. Thus forming compartments open at their outer sides for receiving and discharging materials. Positioned between the partitions 23, 24, 25, 26, 27 and 28 and secured thereto are reinforcing ribs or plates 29, 30, 31, 32, 33 and 34. It follows now that since the partitioned carrier 18 is mounted on side frames 12 and 13 for rotary movement each compartment may be moved successively into loading position at the scraper blade for receiving materials scraped up by the advancing movement of the device and may be moved successively into position at the top of the device to receive materials from any suitable auxiliary loading means such as a power shovel.

Formed on the rear end of the main frame and constituting a part thereof is a pair of box like members 35 and 36 each carrying at their lower rear ends a pair of lugs 37 and 38 between which are rockably supported on pivots 39 and 40 axles 41 and 42 having journaled on each end thereof wheels 43 and 44, and 45 and 46. Turnably mounted in each of the axles midway between the ends thereof is a cam bushing 47 adapted to receive pivots 39 and 40. Any suitable means, such as a set screw, may be used to secure the bushing 47 in any desired position. It is practically impossible, and is impracticable, to manufacture a device of this type so that, when completed and assembled for operation, the scraping edge 17, and the pivots 39 and 40, will both be exactly in a horizontal plane. But unless this condition prevails the scraper blade 17 will dig more at one end than the other and one end of a compartment will become loaded before the other. Therefore, cam bushings 47 have been provided and arranged so that by manipulation of said bushings 47 the desired relation of the scraper 17 and pivots 39 and 40 may be obtained.

Also formed on the rear end of the main frame is a rearwardly projecting member 48 adapted at its rearmost end, as at 49, to mesh with a companion member, such as 50, carried by a pushing vehicle such as a tractor 51, whereby said vehicle may push the device herein described forward. Member 50 is carried by a pusher frame designated generally as 52 comprising substantially spaced apart side arms 53 and 54 adapted at their rear ends for connection to or substantially in line with the dead axle 55 of the pushing vehicle 51, and carrying at their forward ends a transversely extending cross beam 56 carrying member 50. Secured at the forward end of the tractor is bracket means 57 adapted at their outer ends to receive a rod 58 connected at its lower end to cross beam 56 and extending upwardly through and substantially above brackets 57 and threaded on its upper end to receive a nut 59. Interposed between brackets 57 and nuts 59 and encircling rod 58 is compression spring means 60. The tractor 51 is of conventional design and construction. It will be readily understood that as the tractor 51 pushes the scraper across a surface to be treated that, due to uneven surfaces, rock and the like, there will naturally be relative movement as between the tractor and the scraper, and means must be provided to allow of said relative movement without disengaging the pushing member 50 and the pushed member 49. It is easy to see that the means above described will accomplish this end. The actual shape and construction of members 49 and 50 need not of necessity be exactly as shown. Substantially the same results might be accomplished in the following manner. The tractor 51 may be equipped with a bulldozer of conventional design, instead of the pusher frame 52 carrying member 50, member 49 carried by the scraper being shaped as shown at 61 to engage the curved mole board of a bulldozer. Note that rearwardly of the scraper blade 17 and secured to plate 16 is a transversely extending angle 62 forming, in conjunction with plate 16, a reinforcing box like beam to the rear side of which is secured member 48. Thus an extremely well adapted structure is provided to receive the pushing efforts of tractor 51.

Secured to the cross beam 10 and extending forwardly therefrom is a member 63, forming a part of the main frame, comprising spaced apart plates 64 and 65 connected at their forward ends by a plate 66. Interposed between plates 64 and 65 and journaled thereon by pins 67, 68, 69 and 70 are rollers 71, 72, 73 and 74 formed, arranged and mounted to receive a post 75 for movement relative thereto. It will be noted now that the forward end of the main frame is thus associated with post 75 for up and down movement thereon, that the post 75 is a rectangle in its cross section, and the rollers 71, 72, 73 and 74 are formed to substantially surround the post 75 and hold said post in a position free from frictional contact with any portion of the frame, that is, plates 64 and 65. Attention is directed to the fact that the form and shape of the rollers 71, 72, 73 and 74 and the arrangement of the post as herein shown, is an improvement upon the disclosures made in my pending application for Letters Patent Serial No. 40,847, filed September 16, 1935, now Patent No. 2,148,359.

The lower end of post 75 is provided with a longitudinally extending bearing 76 having mounted therein, for turning movement, a shaft 77 carrying at its lower end a ball socket 78. Mounted in ball socket 78 is a ball 79 rigid with an axle 80 having journaled on each end thereof rolling supports 81 and 82. Secured to axle 80 and extending forwardly therefrom is a draft pole 83 adapted at its forward end for connection to a draft device. It will be noted that axle 30 passes through ball 79 slightly forward of the center thereof. Thus the weight of the device, as applied to the ball 79 by socket 78, acts as a counterbalance to approximately offset the weight of draft pole 83 making it an easy matter for one man to lift draft pole 83 and connect same to draft device.

Formed in each end of beam 2 is square tapered sockets 84. Since these sockets 84, together with the control mechanism for revolving carrier 18 positioned at each side of the device on the side frames 12 and 13 are identical, except that some parts may be right or left hand, only one will be described. Socket 84 carries a square tapered member 85 secured therein by a cap screw 86, said member 85 having formed thereon a round portion 87 and a toothed wheel 88. The round portion 87 is journaled in a bearing 89 carried by side frame 12 and 13. Mounted on side frame 12 and 13 as shown at 90 is an arm 91 carrying a detent 92, and a resilient means 93 for urging said detent 92, into engagement with projections 94 carried by toothed wheel 88. Side frames 12 and 13 also carry a detent 95 at 96 adapted to engage projections 94 on wheel 88 to secure carrier 18 against reverse rotation. Extending transversely of the device and connected at its ends to the free ends of arms 91 is a member 97. Connected to member 97 is brackets 99 carrying sheaves 98. Mounted in box like member 10 of the main frame at 100 is sheaves 101. Connected to the main frame at 102 is an end of a cable 103 passing thence back and forth about sheaves 98 and 100 and extending forwardly to and then downwardly over sheave 104 to and about a direction change sheave 105 thence forwardly to a winding drum of conventional design, not shown, carried on a draft device, not shown. Thus, it is apparent, viewing Figure 2, that the winding drum, not shown, may be released thus allowing the forward ends of arms 91 to drop downwardly until detents 92 engage projections 94 after which the winding drum, not shown, may be operated to wind up cable 103 thus raising the forward ends of arms 91, and since detents 92 carried by arms 91 have engaged a projection 94, upward swinging of arms 91 will result in rotating carrier 18 to bring the next compartment into loading position.

Journaled on the ends of beam 22 at opposite sides of carrier 18 between the head plates 20 and 21 and side frames 12 and 13 are plates 106 carrying a shutter 107. Note that the shutter 107 is adapted to close two compartments at the same time, extending from the outer edge of partition 23 to the outer edge of partition 25. The main frame carries a pair of rollers 108 at 109, said rollers extend through any suitably formed openings in plate 110 and contact shutter plate 107 to support and eliminate friction as between shutter plate 107 and plate 110. Attached to arms 91 opposite shutter 107 is projection 111. Mounted on shutter 107, see Figure 3, operating relation to projections 111 is a latch mechanism 112 to which is attached a pull rope 113 extending upwardly over a sheave 114, see Figure 6, journaled on a pin 115 carried by brackets 116 supported on the main frame, said pull rope 113 extending thence forwardly to within easy reach of the operator on the tractor. The latch mechanism 112 is better shown in the enlarged Figures 8 and 9. Journaled on pin 117 carried by brackets 118 supported on shutter 107 is an arm 119 carrying a lever 120 to which is attached the pull rope 113 herein before referred to. Positioned at each end of shutter 107 and slidably mounted in brackets 121 and 122 are latch bars 123 the outer ends of which are adapted to releasably engage projections 111 carried by arms 91. Longitudinally adjustable connecting rods 124 are pivotally connected at their inner ends to the outer ends of arm 119 and pivotally connected at their outer ends to the inner ends of latch bars 123. Compression springs 125 normally urge latch bars 123 into position to engage projections 111. Thus it is seen that a pull exerted on pull rope 113 will withdraw latch bars 123 from engagement with projections 111, and thus arms 91 may be swung independently of shutter 107 to revolve carrier 18 and consequently all compartments may be full at the same time when the carrier is loaded through the opening in the top of the frame by any suitable auxiliary loading device such as a power shovel, because shutter 107 may be allowed to remain in the closed position shown in Figure 3 while arms 91 may be operated to revolve carrier 18 to bring each compartment in turn into loading position at the top of the frame until all compartments are full without spilling materials out onto the ground over the scraper blade 17. Yet, after carrier 18 has been loaded by any suitable auxiliary loader and transported to the place of discharge the shutter may then be operated simultaneously with arms 91 to discharge the materials at the bottom over scraper blade 17. When the compartments are loaded with materials scraped up by the advancing movement of the device, the shutter 107 constitutes a novel means of eliminating friction as between the materials in upwardly moving loaded compartments and any stationary structure which might be used in place of movable shutter 107, because shutter 107 serves to close upwardly moving compartments and by allowing the latch mechanism 112 to remain in engagement with projections 111 carried by arms 91, the shutter may be moved upwardly with loaded compartments without materials coming in contact with stationary structure.

It should be noted that plate 106, see Figure 3, carrying shutter 107, extends substantially rearwardly of the lower edge of shutter 107 between a carrier 18 head plate and side frame of the main frame. This plate 106 extends rearwardly to a point where, when the shutter 107 is raised to its uppermost limit the rear portion of plates 106 will still be positioned between a carrier 18 head plate and a side frame to prevent the entrance of incoming materials into this space. Note, also, that at the rear edge of plates 106 is an opening 126, see Figures 1 and 3, through plates 14 and 16 and angle 62 at 127 through which any materials which may enter this space may spill through onto the ground.

Attached to the upper end of post 75 and extending forwardly therefrom is bracket means 128 carrying a pin 129 having journaled thereon sheaves 130. Carried by the forward ends of plates 64 and 65 is a pin 131 carrying sheaves 132. Attached to the main frame at 133 is an end of a cable 134. Cable 134 passes back and forth about sheaves 129 and 132, thence downwardly and about a direction change sheave 135 mounted on the forward end of the main frame, and thence forwardly to a winding drum of conventional design, not shown, mounted on the draft device. Thus the elevation of the scraper blade 17 is controlled by winding up or releasing cable 134 resulting in raising or lowering the front end of the main frame and the scraper blade 17 attached to said main frame.

Mounted on the side frames 12 and 13 are digging members 135 removably mounted and constituting in effect, an extension of the scraper blade 17 to or slightly beyond the outer limits of side frames 12 and 13.

Secured to and constituting reinforcing means for side frames 12 and 13, are channels 136, 137, 138 and 139, or any suitable equivalent thereof.

Referring now to Figures 10 to 17 inclusive, the device herein before described is shown having certain modified parts, members and features which same will now be described.

The carrier 18a, see Figure 11, differs from the carrier 18 already described in that the head plates 20 and 21 of carrier 18 have been eliminated and side frames 12 and 13 are utilized to close the ends of the compartments, and a multiplicity of reinforcing ribs or plates 29', 30', 31', 32', 33', and 34' are provided in each compartment. There has been added, to the side frames 12 and 13 as previously described, plates 140, see Figure 10, thus enclosing the control mechanism comprising arms 91' and associated mechanism including detents 92' and 95' and toothed wheel 88'. Thus the side frames 12 and 13 with the addition of plates 140 constitute a box-like structure in the forward end of which has been provided an opening 141, see Figure 12, for the forwardly projection therefrom of arms 91'.

The carrier 18a is journaled on side frames 12 and 13 at 19 a detailed showing of which is made in Figure 13. Referring now to Figure 13, it will be noted that the round portion 87' and toothed wheel 88' are provided with a key and keyway 142 to hold toothed wheel 88' against turning movement on the round portion 87'. Thus rotation of toothed wheel 88' will result in rotating beam 22 and carrier 18a. The shutter arms 106 previously described have been eliminated and substituted therefor are shutter arms 143 pivotally mounted on the outer ends of member 85'. Still viewing Figure 13, it will be noted that certain or all of the partitions 23', 24', 25', 26', 27', and 28' have been provided with removable extension plates 144. The reason for this arrangement is as follows: Bearings 89' project inwardly and assuming the side frames 12 and 13 assembled in place and carrying the bearings 89', and the partitions 23', 24', 25', 26', 27' and 28' rigid with the beam 22', it is necessary to provide some or all of said partitions with removable extensions 144 whereby said extensions 144 may be removed until carrier 18a is installed in place after which said extensions may be mounted in place on said partitions to extend said partitions outwardly to within close proximity to side frames 12 and 13.

Referring now to Figures 11 and 12, detachably secured to box-like structure 10 by any suitable means, such as bolts 145, is a curved plate 146 extending downwardly and serving to reduce the size of the opening between the box-like structure 10 and the scraper blade 17 to approximately the size of the intake and discharge opening of each compartment. As shown, this plate 146 also serves as a shutter for a compartment on the forward side of the carrier after said compartment has been moved from loading position.

Referring again to Figures 10 to 17 inclusive, the device is shown as provided with a pair of members 143 positioned one at each side of the device and pivotally mounted on side frames 12 and 13 and carrying at their forward ends a shutter generally designated as 147 and including a boxlike structure 148 at its forward side and a bottom plate 149 attached thereto and carrying at its rear edge a hollow structure 150, said members 143 being provided at their lower ends with openings 151 through which materials may be discharged to the side of the device. Mounted at one end of the shutter 147 are bearings 152 and 153 having journaled therein a shaft 154 carrying a roller 155. Mounted adjacent the opposite end of shutter 147 bearings 156 and 157 having journaled therein a shaft 158 carrying a roller 159 rigid therewith to be turned thereby. Passing around about rollers 155 and 159 is an endless conveyor belt 160. The forward end of shaft 158 carries a driven gear 161 meshing with a driving gear 162 carried by a shaft 163 journaled in bearings 164 and 165 mounted on boxlike structure 148. Shaft 163 carries a winding drum 166 having formed therein at opposite sides of shaft 163 a pair of stops 167 adapted to engage a pair of pins 168 slidably mounted in shaft 163 and projecting at opposite sides thereof for engaging stops 167 carried by winding drum 166. Shaft 163 carries a compression spring 169 interposed between the inner ends of pins 168 to constantly urge said pins 168 outwardly into engagement with stops 167. Viewing Figure 17, it will be seen that counterclockwise rotation of winding drum 166 will result in rotation of shaft 163 carrying driving gear 162 meshing with driven gear 161 rigid with shaft 158 and thus cause clockwise rotation of driven gear 161 to the end that conveyor belt 160 will be operated to discharge materials to the side of the device. Wound around and about the forward end of winding drum 166 and anchored thereto at an end is a cable 170 leading from the winding drum 166 to and upwardly about a sheave 171 journaled on a pin 172 carried by brackets 173 mounted in the boxlike structure 148, thence about a sheave 174 journaled on brackets 175, thence upwardly and about sheave 176 journaled on pin 177 carried by brackets 178. Cable 170 extends thence forwardly to a winding drum of conventional design mounted on the draft device. Thus, the winding drum on the draft device may be operated to wind up cable 170 causing the unwinding of cable 170 on winding drum 166 causing counterclockwise rotation of drum 166 and the results is operation of conveyor belt 160 to discharge materials to the side of the device. Means are provided for rewinding cable 170 on winding drum 166 as follows: Secured to one of said plates 143 as at 179 is tubular member 180 carrying at its opposite end a cap piece 181 having an opening therethrough for the passage of a rod 182 carrying at its inner end a head piece 183 and at its outer end sheaves 184. Interposed between cap piece 181 and head piece 183 and encircling rod 182 is a compression spring 185. Journaled on pin 186 carried by brackets 187 are sheaves 188. Wound around and about the rear end of winding drum 166 and anchored at an end thereto, is cable 189 extending thence back and forth about sheaves 184 and 188 and anchored at its end to the shutter 147. It should be noted at this point that cables 170 and 189 are wound on winding drum 166 in opposite directions, therefore, when the winding drum on the draft device is operated to wind up thereon, cable 170 thus unwinding cable 170 from winding drum 166, cable 189 will be wound up on drum 166 drawing head piece 183 toward cap piece 181 and thus compressing spring 185. Then, when the winding drum on the draft device is released the force exerted by compression spring 185 upon cable 189 will rotate drum 166 in a clockwise direction thus rewinding cable 170 on drum 166. Conveyor belt 160 may be utilized to discharge materials to either side of the device by simply tightening set screw 194, see Figure 16, thus preventing rotation of drum 166 on shaft 163. Then conveyor belt 160 is caused to discharge to one side of the device as already described, and to the other side of the device by the force of spring 185 exerted on cable 189 to rotate drum 166 in a clockwise direction. In other words, when winding drum 160 is secured against rotation on shaft 163 conveyor belt 160 is operated in one direction by cable 170 and the winding drum carried on the draft device, and in the opposite direction by the action of spring 185 upon cable 189. Thus materials may be discharged to either side of the device.

It should be noted that shutter 147 carries no latch mechanism such as 112 of Figure 3 by means of which the shutter 107 is latched to arms 91 for raising and lowering. Instead, shutter 147 of Figure 10 is raised and lowered by the operation of cable 170 on the winding drum carried on the draft device. Shutter 147 carries a latch bar 190 slidably mounted in brackets 191 and 192 adapted at its lower end to engage driving gear 162 to prevent rotation of same when cable 170 is operated to raise and lower shutter 147. As shown in the drawings latch bar 190 is raised to disengage the lower end thereof from gear 162 to allow cable 170 to operate conveyor belt 160. Disengagement is accomplished by a pull on pull rope 193. However, unless latch bar 190 is disengaged from gear 162 before operating cable 170 then operation thereof will result in raising and lowering shutter 147.

Obviously the materials discharged to the side of the device by conveyor belt 160 is received thereby from the compartments of the revolvable carrier 18a as said compartments are brought successively into position to discharge their loads onto conveyor belt 160.

Figure 19 simply illustrates the operation of cables 103 and 134 by hydraulic jacks 195 and 196 of conventional design instead of being carried forward to a winding drum on the draft device as hereinbefore described.

From the foregoing description it will be apparent to one versed in the art that I have disclosed and described a device as substantially fulfills the objects of the invention as set forth, and while these specifications set forth in detail the present and preferred construction of the device, in practice such arrangement, co-relation, and construction of parts members and features may be resorted to as do not form a departure from the spirit of the invention, as defined in the claims.

Having thus described my invention, what I claim as new and useful and desire to secure by Letters Patent is:

1. A machine of the character described comprising a main frame structure adapted to travel over a surface to be treated and having a housing formed with an intake opening at its forward side for passage of material, a scraper carried by said frame beneath said opening, a multiple compartment carrier rotatable with relation to said main frame structure, said individual compartments of said carrier to receive material scraped up by the scraper as they successively move to the loading position in register with said intake opening, means for imparting step by step movement to the carrier to bring empty compartments successively into said loading position and to move the loaded compartments away from said loading position, and a shutter arranged and mounted relative to said intake opening and operable to close the intake opening to retain material loaded into the carrier until ready for discharge.

2. A machine of the character described comprising a main frame structure adapted to travel over the surface of the earth and having an opening on its forward side for passage of material, a scraper carried by said frame beneath said opening, a multiple compartment carrier rotatable with relation to said frame structure, said individual compartments to receive material scraped up by the scraper as they successively move to the loading position in register with said opening, means for imparting step by step movement to the carrier to bring each compartment of the carrier successively into position above the scraper adjacent the opening in the forward side of the frame to intake and discharge material, and a shutter for the opening in the forward side of said frame arranged relative to said intake opening, and means to manipulate said shutter to positively determine the size of said opening.

3. A machine of the character described comprising a main frame structure adapted to travel over a surface to be treated having an intake opening on its forward side for passage of material, a scraper carried by said frame beneath said opening, a multiple compartment carrier rotatable with relation to said main frame structure, said individual compartments of said carrier to receive material scraped up by the scraper, a shutter for the intake opening arranged relative to said scraper, and a common operating means to impart step by step movement to the carrier and manipulate the shutter.

4. A machine of the character described comprising a main frame structure adapted to travel over a surface to be treated having an intake opening on its forward side for passage of material, a scraper carried by said frame beneath said opening, a multiple compartment carrier rotatable with relation to said frame structure, said individual compartments of said carrier to receive material scraped up by the scraper, said carrier being disposed in said frame for rotary movement, a shutter for said intake opening arranged and mounted relative to said scraper, and a common operating means to revolve said carrier and manipulate said shutter.

5. A machine of the character described comprising a main frame structure adapted to travel over a surface to be treated and having a housing formed with an intake opening at its forward side for passage of material, a scraper carried by said frame beneath said intake opening, a multiple compartment carrier rotatable with relation to said main frame structure, said individual compartments of said carrier to receive material scraped up by the scraper, means for imparting step by step movement to the carrier to bring empty compartments successively into loading position and to move loaded compartments away from loading position, and a shutter disposed at the forward side of said carrier and adapted to serve as a closure for a plurality of said compartments at the same time.

6. A machine of the character described comprising a main frame structure adapted to travel over a surface to be treated and having a housing formed with an intake opening at its forward side for passage of material, a scraper carried by said frame beneath said intake opening, a multiple compartment carrier rotatable with relation to said main frame structure, said individual compartments of said carrier to receive material scraped up by the scraper disposed in said frame, means for imparting step by step movement to said carrier to bring empty compartments successively into loading position and to move loaded compartments away from loading position, and a shutter disposed at the forward side of said carrier to move upwardly therewith and serve as a closure for a plurality of upwardly moving compartments at the same time.

7. A machine of the character described comprising a main frame structure adapted to travel over a surface to be treated and having a housing formed with an intake opening at its forward side for passage of material, a scraper carried by said frame beneath said intake opening, a multiple compartment carrier rotatable with relation to said main frame structure, said individual compartments of said carrier to receive material scraped up by the scraper disposed in said frame, means for imparting step by step movement to said carrier to bring empty compartments successively into loading position and to move loaded compartments away from loading position, a shutter for certain of the loaded compartments disposed at the forward side of the carrier and adapted to be moved upwardly with the loaded compartments to prevent friction as between material in the loaded compartments and adjacent frame structure, and means to move said shutter upwardly simultaneously with the loaded compartments.

8. A machine of the character described comprising a main frame structure adapted to travel over a surface to be treated and having a housing formed with an intake opening at its forward side for passage of material, a scraper carried by said frame beneath said intake opening, a carrier rotatable with relation to said main frame structure disposed in said frame, said carrier comprising a multiplicity of compartments open on their outer sides when in loading position to receive material scraped up by the scraper, means for imparting step by step movement to said carrier to bring empty compartments successively into loading position and to move loaded compartments away from loading position, a shutter disposed at the forward side of said carrier operable to close or open a compartment in loading position, and control means for imparting movement to said shutter to close or open said compartment.

9. A machine of the character described comprising a main frame structure adapted to travel over a surface to be treated and having a housing formed with an intake opening at its forward side for passage of material, a scraper carried by said frame beneath said opening, a carrier horizontally disposed in said frame comprising a horizontally disposed beam, a plurality of laterally disposed plates spaced about the circumference of said beam attached at their inner edges thereto and forming a plurality of sections to receive material scraped up by the scraper, means for imparting step by step movement to said carrier to bring empty sections successively into loading position and to move loaded sections away from loading position, and a shutter disposed forwardly of said carrier and operable to close a section disposed in loading position to prevent material spilling outwardly therefrom on to the ground.

10. A machine of the character described comprising a main frame structure adapted to travel over a surface to be treated and having a housing formed with an intake opening at its forward side for passage of material, a scraper carried by said frame beneath said opening, a carrier horizontally disposed in said frame comprising a horizontally disposed beam, a plurality of laterally disposed plates spaced about the circumference of said beam attached at their inner edges thereto and forming a plurality of sections to receive material scraped up by the scraper, a plurality of spaced apart reinforcing ribs for each of said laterally disposed plates, means for imparting step by step movement to said carrier to bring empty sections into loading position, and a shutter disposed forwardly of said carrier and operable to close a section disposed in loading position to prevent material spilling outwardly therefrom on the ground.

11. A machine of the character described comprising a main frame structure adapted to travel over a surface to be treated and having a housing formed with an intake opening at its forward side for passage of material, a scraper carried by said frame beneath said opening, a multiple section carrier rotatably disposed in said frame structure to receive material scraped up by the scraper as the individual sections are successively moved to the loading position in register with said intake opening, ratchet control stop means for imparting step by step movement to said carrier in one direction to bring empty sections successively into loading position and to move loaded sections away from loading position, means independent of said control means to prevent movement of said carrier in the opposite direction, and means for closing the intake opening whereby material loaded in said section will be retained therein and whereby all sections may be full at the same time.

12. A machine of the character described comprising a main frame structure adapted to travel over a surface to be treated and having a housing formed with an intake opening at its forward side for passage of material, a scraper carried by said frame structure beneath said opening, a multiple section carrier rotatably disposed in said frame to receive material scraped up by said scraper as the individual sections are successively moved to the loading position in register with said intake opening, ratchet control stop means having limited back and forth movement for imparting step by step movement to said carrier in one direction to bring empty sections successively into loading position and to move loaded sections away from loading position, stop means independent of said control means to prevent movement of said carrier in the opposite direction and shutter means for closing the intake opening and retaining material loaded in said sections whereby all sections may be full at the same time.

13. A machine of the character described comprising a main frame structure adapted to travel over a surface to be treated and having a housing formed with an intake opening at its forward side for passage of material, a scraper carried by said frame beneath said intake opening, a multiple section carrier disposed in said frame to receive material scraped up by said scraper as the individual sections are successively moved to their loading position in register with said intake opening, a notched wheel rigid with said carrier, an arm mounted at one end relative to said notched wheel, a detent carried by said arm engageable with said notched wheel, power operated means connected to the other end of said arm to swing said arm for imparting step by step movement to said carrier to bring empty sections successively into loading position and to move loaded sections away from loading position and operable shutter means for closing the intake opening and retaining material loaded in said sections until ready for discharge.

14. A machine of the character described comprising a main frame structure adapted to travel over a surface to be treated and having a housing formed with an intake opening at its forward side for passage of material, a scraper carried by said frame beneath said intake opening, a multiple section carrier rotatable with relation to said main frame structure, said individual sections to receive material scraped up by said scraper as they successively move to their loading position in register with said intake opening, a notched wheel rigid with said carrier, an arm arranged and mounted at one end relative to said notched wheel, a detent carried by said arm engageable with said notched wheel, power operated means connected to the other end of said arm to swing said arm for imparting step by step movement to said carrier to bring empty sections successively into loading position and to move loaded sections away from loading position, a shutter disposed forwardly of said carrier, and latch means carried by said shutter to releasably engage said arms.

15. A machine of the character described comprising a main frame structure adapted to travel over a surface to be treated and having a housing formed with an intake opening at its forward side for passage of material, a scraper carried by said frame beneath said intake opening, a multiple section carrier rotatable with relation to said main frame structure, said individual sections to receive material scraped up by the scraper as they successively move to their loaded position in register with said intake opening, control means for imparting step by step rotary movement to said carrier to bring empty sections successively into loading position and to move loaded sections away from loading position, a shutter disposed forwardly of said carrier, and means connecting said control means and said shutter in a manner to permit relative movement therebetween.

16. A machine of the character described comprising a main frame structure adapted to travel over a surface to be treated and having a housing formed with an intake opening at its forward side for passage of material, a scraper carried by said frame, a multiple section carrier rotatable with relation to said main frame structure, said individual sections to receive material scraped up by the scraper as they successively move to their loaded position in register with said intake opening, control means for imparting step by step rotary movement to said carrier to bring empty sections successively into loading position and to move loaded sections away from loading position, a shutter disposed forwardly of said carrier and means releasably connecting said control means and said shutter for relative movement therebetween.

CHARLES LE BLEU.